United States Patent
Zhu et al.

(10) Patent No.: US 11,093,017 B2
(45) Date of Patent: Aug. 17, 2021

(54) METHOD FOR AUTOMATICALLY OPTIMIZING POWER CONSUMPTION

(71) Applicants: INVENTEC (PUDONG) TECHNOLOGY CORPORATION, Shanghai (CN); INVENTEC CORPORATION, Taipei (TW)

(72) Inventors: Shuaifeng Zhu, Shanghai (CN); Lian-Fei Zhang, Shanghai (CN); Pin-Yi Xiang, Shanghai (CN); Lei Yang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 52 days.

(21) Appl. No.: 16/794,085

(22) Filed: Feb. 18, 2020

(65) Prior Publication Data

US 2021/0132679 A1 May 6, 2021

(30) Foreign Application Priority Data

Nov. 5, 2019 (CN) .......................... 201911072184.1

(51) Int. Cl.
| | |
|---|---|
| *G06F 1/20* | (2006.01) |
| *G06F 1/3234* | (2019.01) |
| *G05B 11/42* | (2006.01) |
| *G01K 13/00* | (2021.01) |
| *G05D 13/62* | (2006.01) |

(52) U.S. Cl.
CPC .......... *G06F 1/3234* (2013.01); *G01K 13/00* (2013.01); *G05B 11/42* (2013.01); *G05D 13/62* (2013.01); *G01K 2217/00* (2013.01); *G06F 1/20* (2013.01); *G06F 2200/201* (2013.01)

(58) Field of Classification Search
CPC .......... G06F 1/20; G06F 1/3234; G05B 11/42
See application file for complete search history.

(56) References Cited

U.S. PATENT DOCUMENTS

| 9,846,444 B1* | 12/2017 | Yang ................... G05D 23/1919 |
| 10,082,847 B2* | 9/2018 | Raman ..................... G06F 1/203 |
| 10,585,466 B1* | 3/2020 | Lin .......................... G06F 1/206 |

(Continued)

*Primary Examiner* — Mark A Connolly
(74) *Attorney, Agent, or Firm* — Maschoff Brennan (57) ABSTRACT

The present disclosure provides a method for automatically optimizing power consumption. The method includes: (S1) a baseboard management controller determines whether system information is correct or not after powered on. If correct, further proceeding the method. If not correct, stopping further proceeding the method. (S2) the baseboard management controller periodically detects the surface temperature and the internal temperature of the essential element with a first loop cycle and determines whether the surface temperature or the internal temperature is higher than a preset temperature. (S3) If the surface temperature or the internal temperature is higher than the preset temperature, performing a PID adjustment to the fan rotation speed according to the surface temperature or the internal temperature of the essential element. If the surface temperature or the inner temperature is not higher than the preset temperature, performing a stepwise adjustment to the fan rotation speed according to current environment temperature.

18 Claims, 6 Drawing Sheets

(56) References Cited

U.S. PATENT DOCUMENTS

2004/0257013 A1* 12/2004 Chhleda ................ G06F 1/3203
318/268
2019/0042753 A1* 2/2019 Jreij .................... G06F 11/1417

* cited by examiner

FIG. 5 condition that internal/surface temperature
is not higher than preset temperature:

| T1<br>(1800s) | Record fan rotation speed S1 in current cycle, calculate average power consumption of system W1 in current cycle, and let Smin=S1, Wmin=W1, let S2=S1-1% |
|---|---|
| T2<br>(1800s) | Record fan rotation speed S2 in current cycle, calculate average power consumption of system W2 in current cycle, if W2<Wmin, then let Smin=S2, Wmin=W2, and S3=Smin-1%, if W2>Wmin, then let Smin=Smin, Wmin=Wmin, and S3=Smin+1%, |
| T3<br>(1800s) | Record fan rotation speed S3 in current cycle, calculate average power consumption of system W3 in current cycle, if W3<Wmin, then let Smin=S3, Wmin=W3, and S4=Smin-1%, if W3>Wmin, then let Smin=Smin, Wmin=Wmin, and S4=Smin+1%, |

METHOD FOR AUTOMATICALLY OPTIMIZING POWER CONSUMPTION

CROSS-REFERENCE TO RELATED APPLICATIONS

This non-provisional application claims priority under 35 U.S.C. § 119(a) on Patent Application No(s). 201911072184.1 filed in China on Nov. 5, 2019, the entire contents of which are hereby incorporated by reference.

BACKGROUND

1. Technical Field

This present disclosure involves in the field of computer technology, more particularly in a method for automatically optimizing power consumption.

2. Related Art

Internet has become an essential way for people to exchange information and communicate with each other. As an important tool for providing internet service, a server must have the capability of processing a large amount of data. Nowadays, with the rapid growth of data processing capacity, the scale of servers has increased geometrically, which results in a high-performance requirement for a server system (automatic operation and maintenance system).

Roughly, from a view of appearance, there are three types of servers including upright servers, rack servers and blade servers. A rack server is a kind of structurally optimized upright server. The purpose of designing such rack server is to reduce the space occupied. In general, a width of a rack server is about 19 inches and its height is denoted in unit of "U" (1U=1.75 inches). A rack server is used as an example for illustration. The rack server is a server which appearance is designed in accordance with unified standards and the rack server is used in conjunction with a rack. That is, the rack server is a kind of structurally optimized tower server. The purpose of design of such rack server is to reduce the space which is occupied as much as possible. This kind of rack structure is applied to lots of professional internet equipment, wherein most of them have a flat-type structure just like drawer, such as switches, routers or hardware firewalls.

A basic system architecture of a server is similar to a basic system architecture of a personal computer, which includes components such as CPUs, memories and input/output devices, etc. Those components are connected internally via buses. The CPUs and the memories are connected through a north-bridge chip while the input/output devices are connected through a south-bridge chip.

However, when the server works for a while, the temperature of the whole system (within the main housing or a component) would be raising. In this case, it is necessary to provide a mechanism of cooling for maintaining a reasonable temperature of the system, so that all components are allowed to work normally. Otherwise, it is possible that the problems such as a failure of boot, incorrect setting values, or system instability might occur in the system. Therefore, the service quality of the server would be downgraded when the configuration for the rotation speed of the fans which are responsible for cooling in the system is not proper.

In general, a server is equipped with 4/6/8 fans. For the design of temperature control of the server, the method for adjusting temperature is quite simple or purely adjust the fan rotation speed according to the detected temperature. For example, circuit layouts are arranged for a method of air-blast cooling. Several temperature sensors are disposed in different areas of the mainboard. More particularly, temperature sensors are disposed near components such as memories or CPUs which generate heat. Thereby, a baseboard management controller (BMC) adjusts the fan rotation speed according to the temperature values obtained by the temperature sensors. Although the effect of power saving can be obtained by using the conventional method for adjusting the fan rotation speed, further improvements are still needed based on the theory of semiconductor physics and actual testing data. Due to the trend of green environmental protection, it is desired that the method for adjusting the fan rotation speed can be more efficient.

SUMMARY

Figure 4:
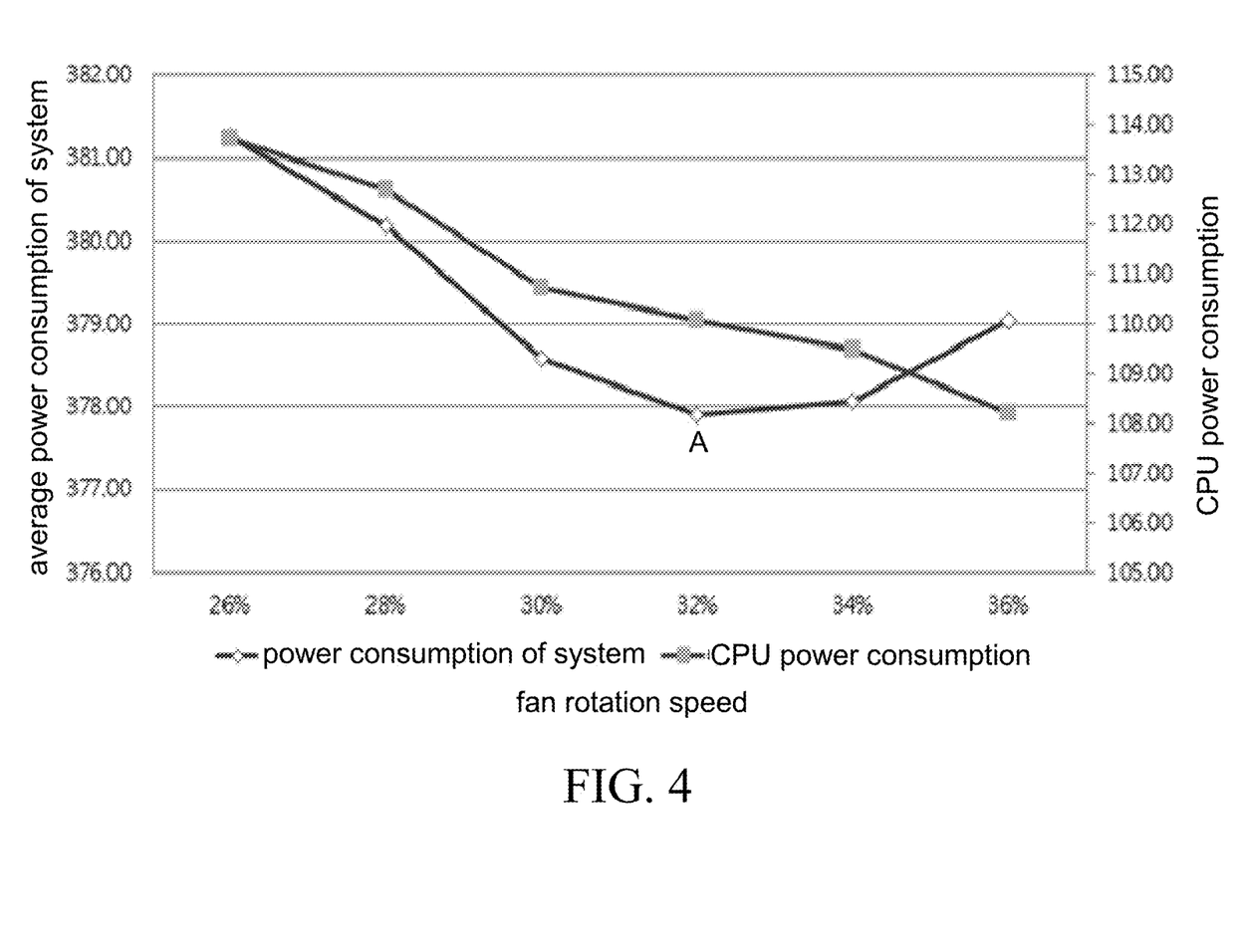
FIG. 4 illustrates a curve of a relationship between average power consumption of system and fan rotation speed and a curve of a relationship between CPU power consumption and fan rotation speed when the system loading is 40% according to one embodiment of the present disclosure.

For solving the above-mentioned problems, a sectional-type method for adjusting a fan rotation speed is disclosed in the present disclosure. In brief, as shown in FIG. 4, the developers of our company made a curve of total power consumption-rotation speed. A normal PID adjustment is used for adjusting the fan rotation speed when the system detects that the temperature value is higher than a preset value. A linear adjustment is used for adjusting the fan rotation speed when the system detects that the temperature value is lower than the preset value. Thereby, a balance between the system power consumption and the fan rotation speed can be maintained, as shown in point A of FIG. 4. That is, by using the technical solution of the present disclosure to adjust the fan rotation speed, not only an efficient cooling could be provided but also a low system power consumption could be maintained. Therefore, an improved effect of power saving can be obtained.

Therefore, a method for automatically optimizing power consumption is disclosed in the present disclosure. A fan rotation speed is adjusted stepwise for maintaining an average power consumption of a server at a lowest level during a normal operation of the server; meanwhile, a surface temperature (Tc) or an internal temperature (Tj) of an essential element is detected, and the method for automatically optimizing power consumption comprises:

In step S1, determining whether system information is correct or not by a baseboard management controller after power on; further proceeding the method when the system information is correct; stopping further proceeding the method when the system information is not correct;

In step S2, by the baseboard management controller, detecting the surface temperature (Tc) or the internal temperature (Tj) of the essential element periodically with a first loop cycle time (Ts), and determining whether the surface temperature (Tc) or the internal temperature (Tj) is higher than a preset temperature (Tsp);

In step S3, performing a PID adjustment to the fan rotation speed according to the surface temperature (Tc) or the internal temperature (Tj) of the essential element when the surface temperature (Tc) or the internal temperature (Tj) is higher than the preset temperature (Tsp); and In step S4, performing a stepwise adjustment to the fan rotation speed according to a current environment temperature (Ta) when the surface temperature (Tc) or the internal temperature (Tj) is not higher than the preset temperature (Tsp).

In the above-mentioned method for automatically optimizing power consumption, the system information at least includes: a baseboard management controller (BMC) version, a BIOS version, field replace unit (FRU) information and system configuration information.

In the above-mentioned method for automatically optimizing power consumption, in step S3, the fan rotation speed is adjusted according to the curve of temperature-rotation speed which is obtained previously, so as to decrease the temperature of the essential element.

In the above-mentioned method for automatically optimizing power consumption, a range of the first loop cycle time (Ts) is defined as 1 s≤Ts≤5 s.

In the above-mentioned method for automatically optimizing power consumption, the preset temperature (Tsp) is set up according to device specifications.

In the above-mentioned method for automatically optimizing power consumption, after performing step S3, a basic value of the fan rotation speed is set according to the current environment temperature Ta before performing step S4 for a first time.

In the above-mentioned method for automatically optimizing power consumption, in step S4, a plurality of cycles are defined as each having a second loop cycle time (T), a present system average power consumption is calculated and compared with a minimum average power consumption in each of the plurality of cycles; the fan rotation speed is increased in a next cycle and the minimum average power consumption remains unchanged when the present system average power consumption is greater than the minimum average power consumption; the fan rotation speed is decreased in a next cycle and a value of the minimum average power consumption is updated with a value of the present system average power consumption when the present system average power consumption is less than the minimum average power consumption.

In the above-mentioned method for automatically optimizing power consumption, a present value of the fan rotation speed and the value of the present system average power consumption in a first one of the plurality of cycles are recorded, the value of the present system average power consumption is used as a value of the minimum average power consumption, and the present value of the fan rotation speed is set as a basic value corresponding to the current environment temperature (Ta).

In the above-mentioned method for automatically optimizing power consumption, the second loop cycle time (T) is greater than the first loop cycle time (Ts).

In the above-mentioned method for automatically optimizing power consumption, the second loop cycle time (T) is 1800 s.

In the above-mentioned method for automatically optimizing power consumption, a formula of increasing the fan rotation speed is denoted as: S'=S+n %, wherein S represents the fan rotation speed in a present cycle, S' represents the fan rotation speed in a next cycle, n represents an amount of stepwise adjustment, and 0<n<3.

In the above-mentioned method for automatically optimizing power consumption, a formula of decreasing the fan rotation speed is denoted as: S'=S−n %, wherein S represents the fan rotation speed in a present cycle, S' represents the fan rotation speed in a next cycle, n represents an amount of stepwise adjustment, and 0<n<3.

In the above-mentioned method for automatically optimizing power consumption, all information recorded in step S4 is removed when step S3 is performed.

In comparison with the conventional technique, the technical solution of the present disclosure has the following beneficial effects:

1. The system power consumption is decreased and the operation costs are reduced. It is estimated that the operation cost is reduced by around 5 RMB and the electrical power cost is reduced by around 0.5 RMB/° C. in each single server for each reduction of 1 W power consumption.

2. A large amount of testing resources including human resources, material resources and time is saved. It is necessary to collect a large amount of testing data (all operating condition require testing) from each of models of servers and switches in order to develop a dedicated method for adjusting the cooling fan rotation speed when the method for automatically optimizing power consumption disclosed in the present disclosure is not utilized. With the method for automatically optimizing power consumption disclosed in the present disclosure, only specific operating conditions needed to be tested and verified, which would save a lot of time used for data collection and significantly increase the developing efficiency.

DETAILED DESCRIPTION

In order to make the objects and features of the present disclosure more comprehensible, specific embodiments of the present disclosure will be further described below with reference to the accompanying drawings. However, the present disclosure can be implemented in different forms and should not be limited to the embodiments described. And, in the case of no conflict, the embodiments in the present disclosure and the features in the embodiments are allowed to be combined or replaced with each other. The advantages and features of the present disclosure will be clearer in conjunction with the following description.

It should be noted that the drawings are made in simplified forms and the uses of proportions in the drawings are not accurate. The drawings are merely used for illustrating the description of the embodiments of the present invention.

It should also be stated that the purpose of the step numbers in the present disclosure is merely for reference, rather than for limiting the sequence of steps. For some of the steps which require specific sequence, the text will be specifically explained in the specification.

In the process of a long-term research/development and testing, the applicants found that, although it is possible the purpose of power saving is achieved by using the conventional method for adjusting a fan rotation speed, further improvements are still needed. In the basis of the theory of semiconductor physics, due to the properties of thermal electricity, the effect of hot carriers is enhanced when the temperature of an electrical device is raised. Accordingly, the leakage current of the gate is increased. That is, the leakage current is increased when the temperature is raising. In this case, the electrical device becomes a high power-consumption device. Servers or switches or other equipment mostly use these kinds of high power-consumption devices, such as CPUS, GPUs, MOSFETs, memories and hard disks, etc.

The present disclosure uses a CPU as an object for studying the relationship between environment temperature, CPU temperature and a fan within a mainboard housing. Actually, the method for adjusting the same fan rotation speed is also applicable to the control and the optimization of GPUs, MOSFETs, memories and hard disks, etc.

Figure 1:
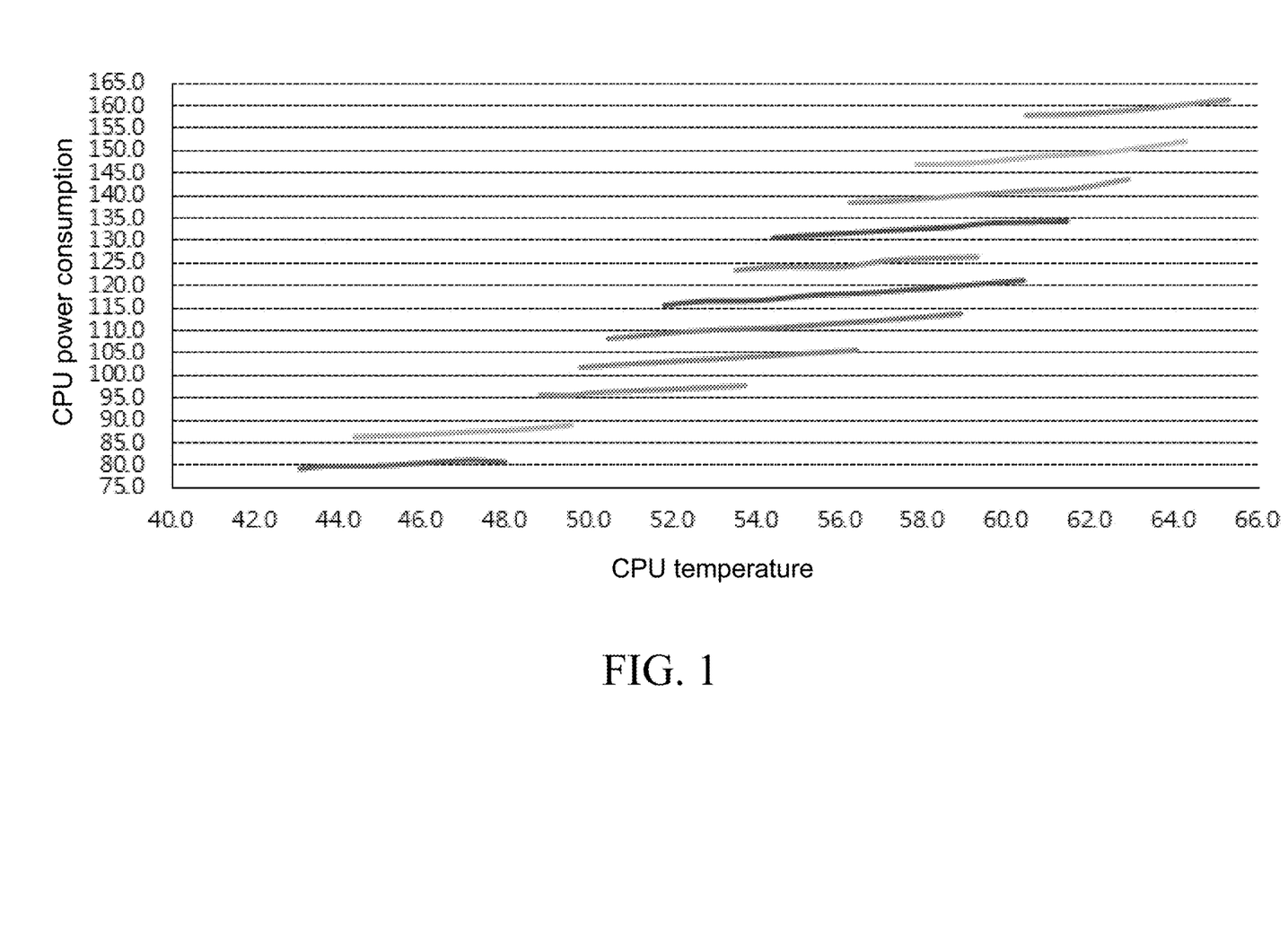
FIG. 1 illustrates a curve of a relationship between CPU power consumption and CPU temperature with respect to various loadings according to one embodiment of the present disclosure.

FIG. 1 illustrates a set of actual testing data of a server with model number of "TB800G4" provided by the company of the applicants. The set of data shows a relationship between the CPU power consumption and the CPU temperature with respect to various loadings. FIG. 1 includes eleven curves in total from top to bottom. The most top one of the eleven curves represents a curve of power consumption-temperature of the server of TB800G4 under 100% loading, and the second top one of the eleven curves represents a curve of power consumption-temperature of the server of TB800G4 under 90% loading and so on. The most bottom one of the eleven curves represents a curve of power consumption-temperature of the server of TB800G4 in standby state. Through the analysis of the eleven curves, it is found that the temperature of the CPU is low when the power consumption of the CPU is low; the temperature of the CPU is high when the power consumption of the CPU is high. The same result is obtained whether the comparison is made in a horizontal or in a vertical basis. Therefore, for the CPU, the decreasing of the temperature is the most important factor to reduce the power consumption. The method of "air blast cooling" is the most common technique used for cooling servers in the industry.

Figure 2:
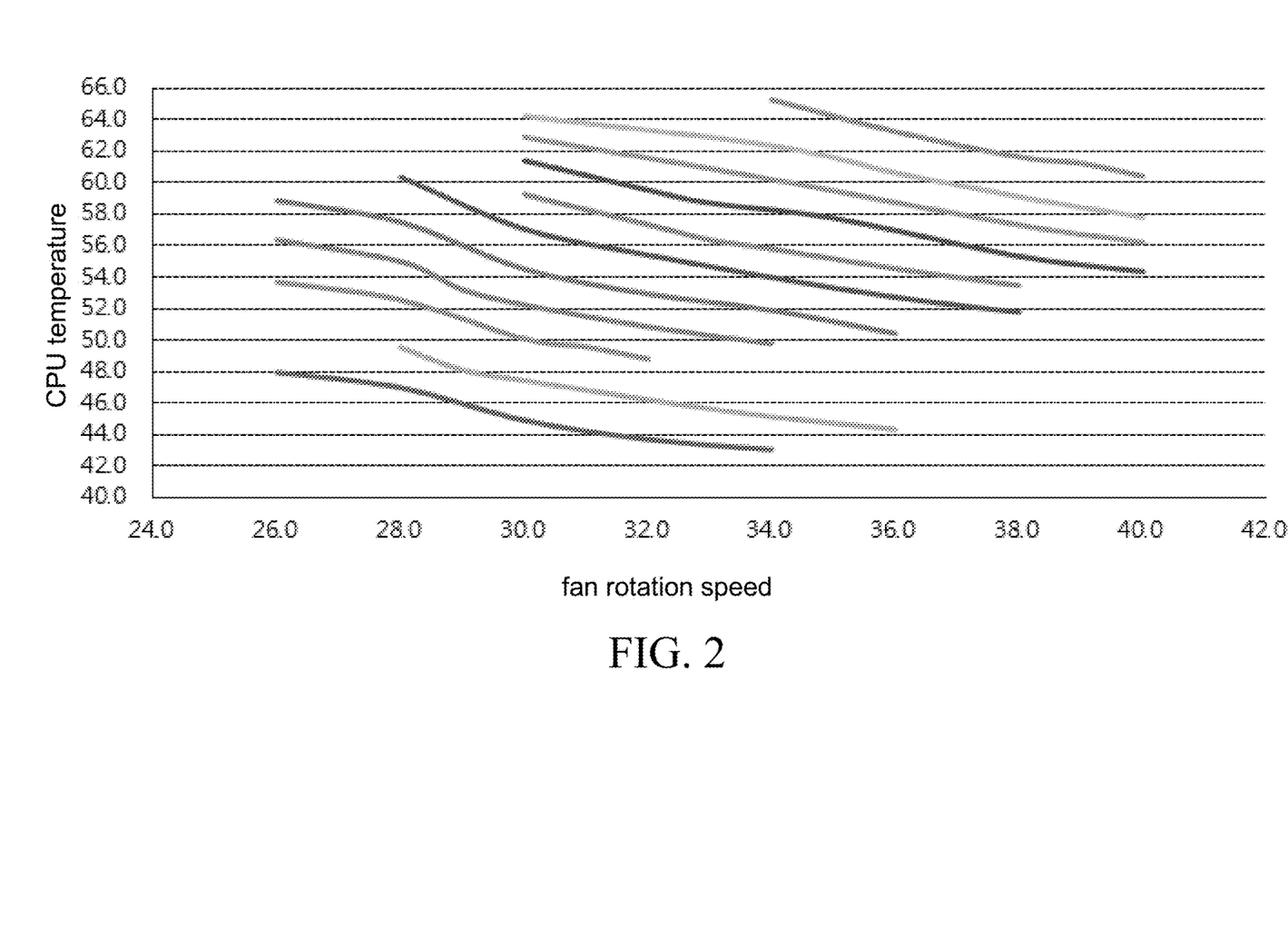
FIG. 2 illustrates a curve of a relationship between CPU temperature and fan rotation speed with respect to various loadings according to one embodiment of the present disclosure.

FIG. 2 illustrates the relationship between the fan and the CPU temperature. FIG. 2 shows data regarding the server of TB800G4 and illustrates the relationship between the CPU temperature and the fan rotation speed with respect to various loadings. Similar to FIG. 1, there is 10% loading difference between any two of the eleven curves in FIG. 2. The most top one of the eleven curve represents a curve of temperature-rotation speed of the server of TB800G4 under 100% loading, and the most bottom one of the eleven curve represents a curve of temperature-rotation speed of the server of TB800G4 in standby state. Through the analysis of the eleven curves, it is found that the CPU temperature is low when the fan rotation speed is high; the CPU temperature is high when the fan rotation speed is low. Similar to FIG. 1, The same result is obtained whether the comparison is made in a horizontal or in a vertical basis in FIG. 2.

From both of FIG. 1 and FIG. 2, the increasing of the fan rotation speed would decrease the CPU temperature, so that the CPU power consumption is reduced. However, since the fan itself has a power consumption, the effect of reducing the power consumption of the system could not be sustained by purely increasing the fan rotation speed. The purpose of the present disclosure is to maintain a minimum total power consumption of the system (average power consumption of the system).

Figure 3:
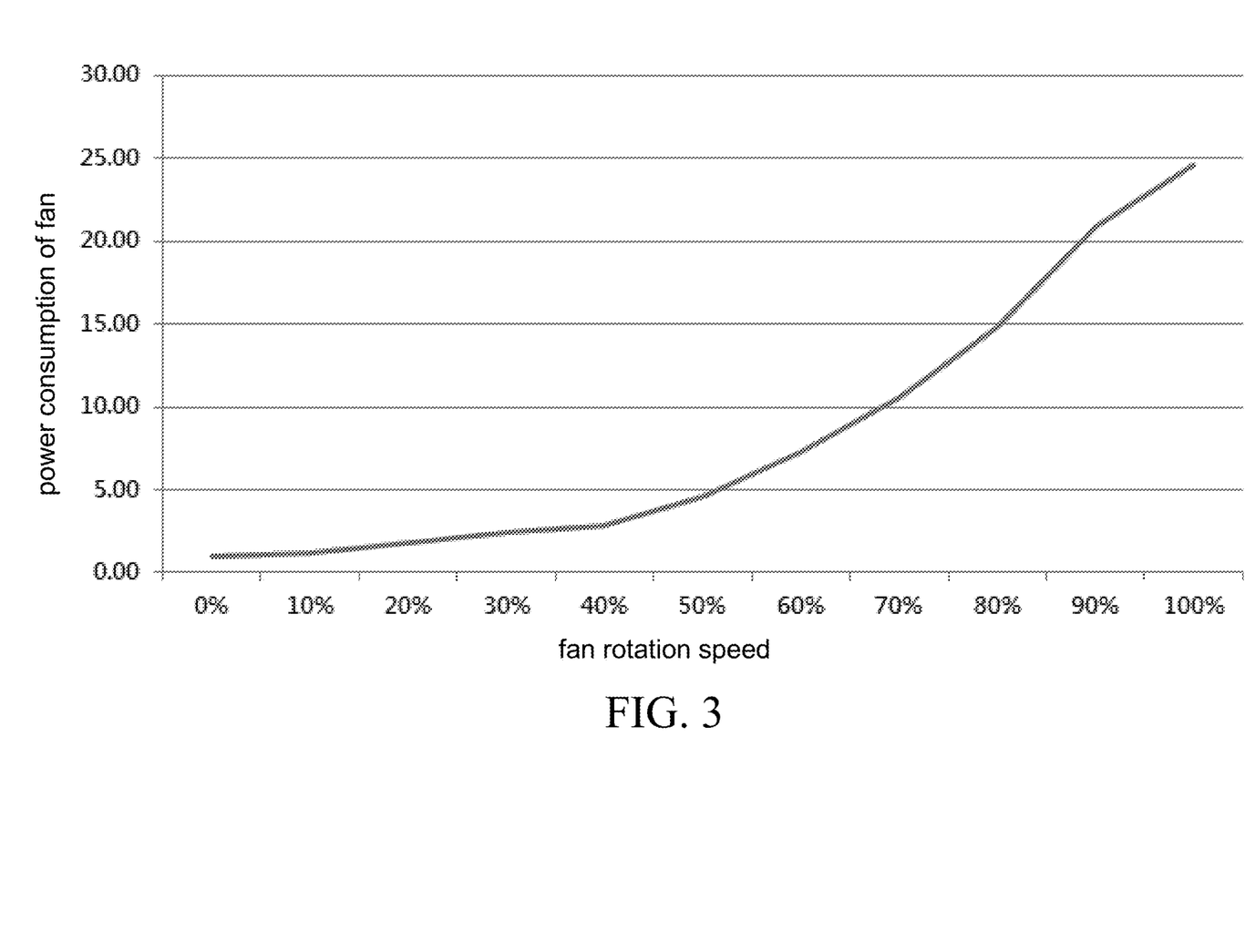
FIG. 3 illustrates a curve of a relationship between fan rotation speed and fan power consumption according to one embodiment of the present disclosure.

FIG. 3 illustrates a curve of a fan power consumption-rotation speed. According to FIG. 3, persons skilled in the art would realize that the fan power consumption increases when the fan rotation speed increases. Therefore, by combining FIG. 1, FIG. 2 and FIG. 3 as well as the daily testing data provide by the applicants, it is obtained that the relationship between the fan rotation speed and the total power consumption of the system could be expressed as a U-shape curve.

In FIG. 4, X-axis coordinates represent the fan rotation speed, the left Y-axis coordinates represent the average power consumption of the system and the right Y-axis coordinates represent the CPU power consumption. In FIG. 4, a curve marked with hollow rhombus is used for representing the curve of average power consumption of system-fan rotation speed while a curve marked with solid square is used for representing the curve of CPU power consumption-fan rotation speed. The prerequisite for this test is a system loading of 40%. As shown in FIG. 4, the curve of average power consumption of system-fan rotation speed is a U-shape curve. According to the data of FIG. 4, the average power consumption of the system is in a minimum state when the fan rotation speed is 32% (point A). At this time, the CPU power consumption is around 110 W, which is not the minimum CPU power consumption.

Therefore, when the system loading is 40%, the controlling target of the present disclosure is to control the value of the power consumption of the system to be near the point A. This curve would be various in conditions of different models and different loadings, so the point A is not fixed. The disadvantages of the conventional technique are that a huge amount of testing and data is required to obtain the point A. The point A is gradually approached by a process of linear adjustment in the present disclosure.

Table 1 is obtained based on a huge amount of data testing made by the inventor. Table 1 illustrates a look-up table of fan rotation speed in condition of optimal power consumption of the system. A basic value of a fan rotation speed can be obtained by querying this table, which provides the fan rotation speed in the first cycle for step 4 (see below for details).

Table 1 shows the fan rotation speed when the power consumption of the system is optimal with respect to different environment temperatures and different system loadings.

| environment temperature (° C.) | system loading | optimal power consumption of system (W) | fan rotation speed (%) |
|---|---|---|---|
| 25 | idle | 287.42 | 30% |
|  | 10% | 313.82 | 30% |
|  | 20% | 335.73 | 30% |
|  | 30% | 356.59 | 30% |
|  | 40% | 377.90 | 32% |
|  | 50% | 399.93 | 36% |
|  | 60% | 421.56 | 34% |
|  | 70% | 444.19 | 35% |
|  | 80% | 467.15 | 34% |
|  | 90% | 491.88 | 38% |
|  | 100% | 521.47 | 38% |
| 30 | idle | 294.46 | 30% |
|  | 30% | 364.21 | 34% |
|  | 50% | 407.27 | 35% |
|  | 100% | 527.70 | 38% |
| 35 | idle | 302.50 | 34% |
|  | 30% | 371.96 | 36% |
|  | 50% | 416.50 | 36% |
|  | 100% | 536.23 | 40% |

It is noted that the fan rotation speed is expressed as a percentage since the controlling is implemented by using the technique of pulse width modulation (PWM) in the present disclosure. Accordingly, the fan rotation speed is expressed based on duty ratios of impulses in this specification. Moreover, the amount of stepwise adjustment for the fan rotation speed is expressed as ±n %.

Figure 5:
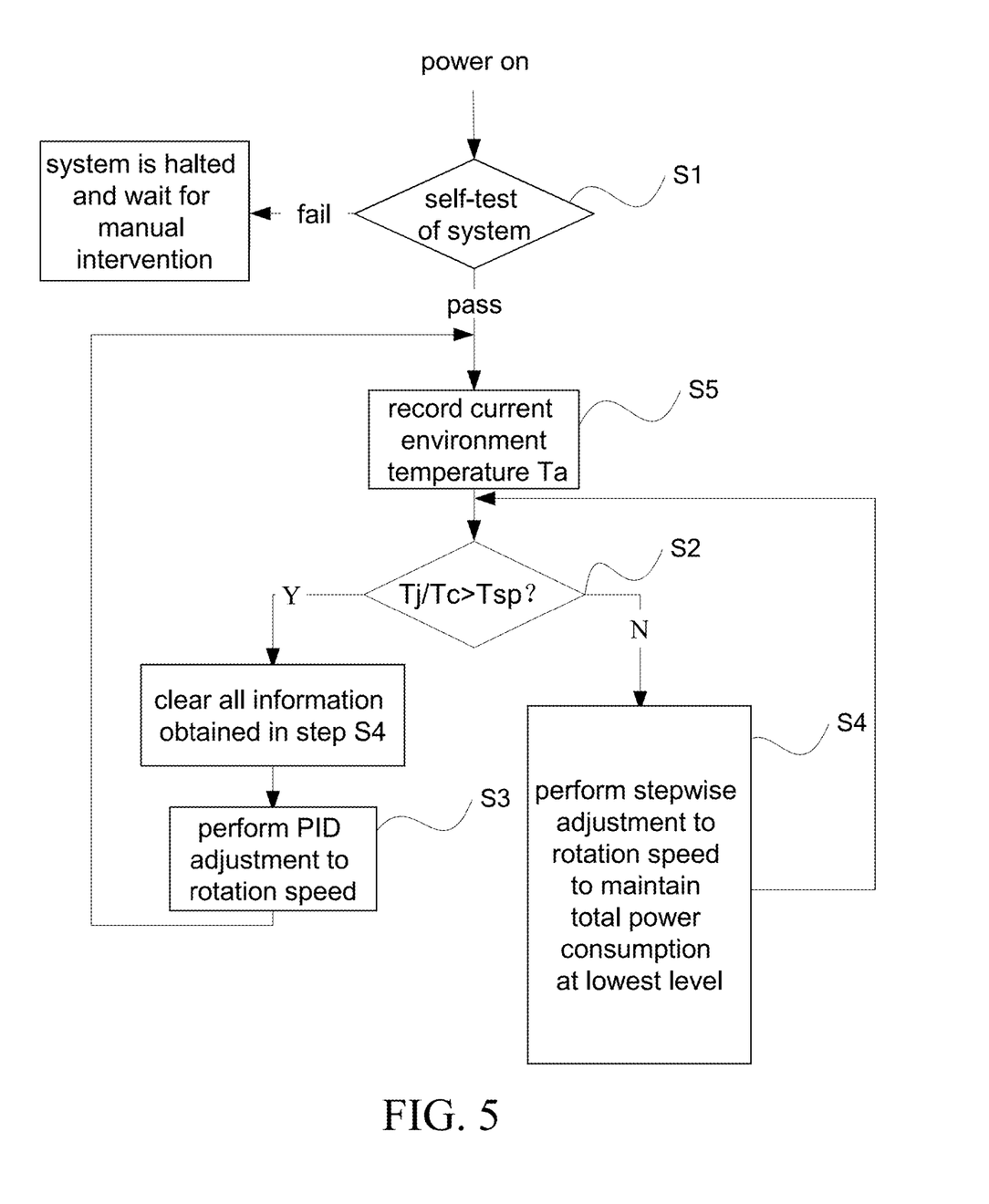
FIG. 5 illustrates a flow chart of a method for automatically optimizing power consumption according one embodiment of the present disclosure.

The present disclosure provides a method for automatically optimizing power consumption due to the inspiration from the curves shown in FIG. 4. The flow chart of the method is illustrated in FIG. 5. The fan rotation speed is adjusted stepwise for maintaining an average power consumption of a server at a lowest level during a normal operation of the server; meanwhile, a surface temperature (Tc) or an internal temperature (Tj) of an essential element is detected. When the surface temperature (Tc) or the internal temperature (Tj) is too high, the fan rotation speed is adjusted according to the surface temperature (Tc) or the internal temperature (Tj). The method for automatically optimizing power consumption comprises:

In step S1, after power on, a baseboard management controller (BMC) determines whether system information is correct or not. The method would be proceeded when the system information is correct. The method would be stopped being proceeded when the system information is not correct. Specifically, the system information at least includes: a baseboard management controller (BMC) version, a BIOS version, field replace unit (FRU) information and system configuration information. If there are several defects or problems existing in those information, then the server is not capable of working anymore. After the server system is halted, an alarm (e.g. voice, light, electricity) is released from the server system to remind people to perform a manual intervention.

In step S2, the baseboard management controller detects a surface temperature Tc or an internal temperature Tj of an essential element periodically with a first loop cycle time Ts, and determines whether the surface temperature Tc or the internal temperature Tj is higher than a preset temperature Tsp. In one embodiment, either the surface temperature Tc or the internal temperature Tj can be selected to be detected depending on conditions of measurement. Further, when there are a plurality of essential elements, each of the plurality of essential elements corresponds to a preset temperature or all of the plurality of essential elements corresponds to the same preset temperature. A CPU is used as an example for illustration in the specification, wherein the essential element refers to the CPU. In one embodiment, since the CPU is capable of detecting its own internal temperature, the monitoring parameter which is selected to be detected in the CPU is the internal temperature Tj. When the internal temperature Tj is higher than the preset temperature Tsp (Tj>Tsp), step S3 is performed. When the internal temperature Tj is lower than the preset temperature Tsp (Tj<Tsp), step S4 is performed.

In step S3, when the internal temperature Tj is higher than the preset temperature Tsp, a PID adjustment is performed to the fan rotation speed according to the internal temperature Tj of the essential element which is the CPU in this embodiment. There is no doubt that the CPU is the most important element in the operation of the server. A serious impact might be applied to the operation of the server or the server even crashes when the work of the CPU is negatively affected due to the high temperature. Therefore, the most effective way is to adjust the temperature of the essential element immediately when the internal temperature is higher than the preset temperature (Tj>Tsp). Specifically, the fan rotation speed is adjusted according to the method of predetermined PID adjustment, so as to decrease the temperature of the essential element. In this embodiment, the curve of CPU temperature-fan rotation speed is shown in FIG. 2.

In step S4, when the internal temperature Tj is not higher than the preset temperature Tsp, a linear adjustment is performed to the fan rotation speed according to according to the environment temperature Ta. When the internal temperature Tj is not higher than the preset temperature Tsp (Tj<Tsp), it is indicated that a danger of overheating does not occurs in the essential element and the system has not reached an ideal state of power consumption-rotation speed balance. That is, the system is not in the state of optimal consumption. In this case, the CPU temperature is allowed to be further increased. In other words, the fan rotation speed is allowed to be further decreased. The CPU temperature could be gradually increased by stepwise adjusting the fan rotation speed, so that the balance of power consumption-rotation speed can be reached.

Further, in step S4, a plurality of cycles are defined as each having a second loop cycle time T. A present system average power consumption is calculated and compared with a minimum average power consumption in each of the plurality of cycles; the fan rotation speed is increased in a next cycle and the minimum average power consumption remains unchanged when the present system average power consumption is greater than the minimum average power consumption; the fan rotation speed is decreased in the next cycle and a value of the minimum average power consumption is updated with a value of the present system average power consumption when the present system average power consumption is less than the minimum average power consumption. The value of the minimum average power consumption is recorded in a previous cycle.

More specifically, before performing step S4 for the first time, the method further includes:

In step S5, the environment temperature Ta and the present system average power consumption are obtained. A basic value of the fan rotation speed is selected by querying table 1 based on the temperature and the power consumption and the fan rotation speed is set as having the basic value.

Specifically, a formula of increasing the fan rotation speed is denoted as: $S'=S+n$ %, wherein S represents the fan rotation speed in a present cycle, $S'$ represents the fan rotation speed in a next cycle, n represents an amount of stepwise adjustment and $0<n<3$. A formula of decreasing the fan rotation speed is denoted as: $S'=S-n$ %, wherein S represents the fan rotation speed in a present cycle, $S'$ represents the fan rotation speed in a next cycle, n represents an amount of stepwise adjustment and $0<n<3$.

Figure 6:
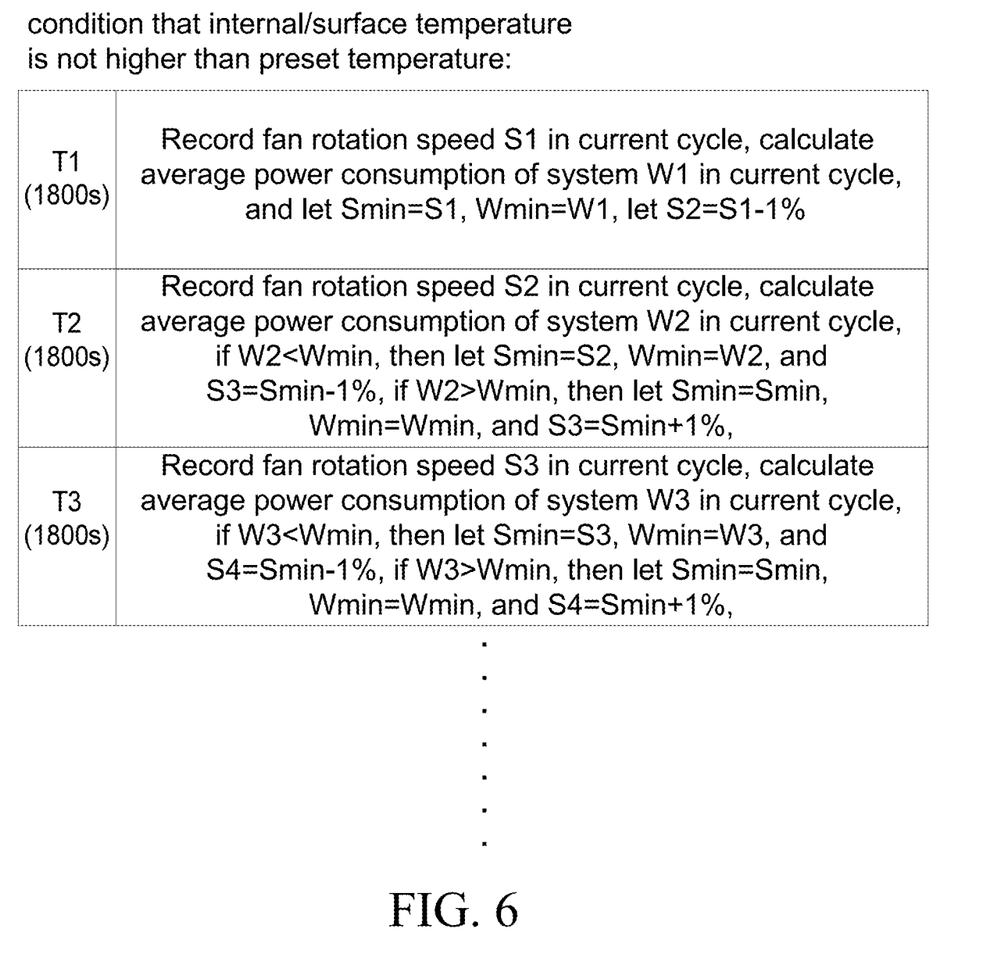
FIG. 6 illustrates a process of step S4 of FIG. 5.

Details regarding the loop-control process of step S4 can be referred to FIG. 6. IN the embodiment of FIG. 6, the second loop cycle time T is set as 1800 s. As shown in FIG. 6, in a first cycle having the second loop cycle time T1, since there is no history data, the fan rotation speed S1 in the present cycle is directly recorded (S1 is equal to the basic value), and let Smin=S1. It is noted that the subscript "min" labeled for the transfer parameter Smin indicates the system power consumption is minimum when the fan rotation speed reaches Smin instead of indicating the fan rotation speed is minimum. The subscript "min" is used for indicating the correlation between the fan rotation speed and the system average power consumption.

Since step S4 is performed when the temperature does not exceed the preset temperature, the process of decreasing the fan rotation speed should be performed. Therefore, the fan rotation speed S2 in the next cycle is set as S1−1% and the system average power consumption W1 in the present cycle is calculated. Similarly, since there is no history data, the system average power consumption W1 is directly recorded as a minimum power consumption Wmin which is desired to be obtained, that is, let Wmin=W1.

In a second cycle having the second loop cycle time T2, first of all, the fan present rotation speed S2 is recorded and the present system average power consumption W2 is calculated. At this time, since there is history data, a comparison can be made for determining whether the adjustment performed in the previous loop is proper or not. When W2<Wmin, it is indicated that the present system average power consumption is relatively lower, which proves that the previous adjustment is correct and a further decreasing of the fan rotation speed is allowed. Accordingly, let Smin=S2, Wmin=W2 and S3=Smin−1%. When W2>Wmin, it is indicated that the present system average power consumption is relatively higher, which proves that the previous adjustment is not correct and an increasing of the fan rotation speed is required. Accordingly, let Smin=Smin, Wmin=Wmin, and S3=Smin+1%.

The same process performed in the second cycle having the second loop cycle time T2 can be applied to a third cycle having the second loop cycle time T3 and further cycles after the third cycle. The relatively smaller Smin and Smin will be recorded as the basis for determining whether to increase or decrease the fan rotation speed.

Further, in step 1, a range of the first loop cycle time Ts is defined as 1 s≤Ts≤5 s. In this embodiment, Ts is 2 s.

In step S3, PID stands for a proportional integral differential (PID) control, wherein P represents proportion, I represents integration, D represents differential. The PID control has three parameters P, I, D. The PID control forms a control deviation according to a given value and an actual output value, and further forms a control amount by performing a linear combination to the deviation based on the three parameters P, I, D for controlling an object to be controlled, so that the controller has the best performance of control.

Further, in step S4, the amount of stepwise adjustment to the fan rotation speed is not necessarily 1%. Instead, the amount of stepwise adjustment n % could be set according to actual demand. Preferably, a range of n is defined as 0-3.

Finally, it is emphasized that, in the above-mentioned method, the loop from step S2 to step S4 (the process as shown in FIG. 6) is the normal loop. The process of this loop is the process that the fan rotation speed is adjusted stepwise through monitoring the minimum power consumption of the server. In this process, when the temperature of an essential element is higher than the preset temperature Tsp, it is indicated that an abnormal situation occurs and a corresponding process for addressing this abnormal situation is required. In this case, the loop from step S2 to step S4 is interrupted and the loop from step S2 to step S3 is performed. All information obtained in the previous loop from step S2 to steps S3 needed to be cleared/removed during the process of performing the loop from step S2 to steps S3 or before restarting to perform step S2 to step S4, and the method restarts from step S5, so as to avoid the condition that the residual old data affects the newly collected data.

In the above method for automatically optimizing power consumption, various curves of power consumption-rotation speed can be made based on a sufficient amount of research data and a rule is obtained by analyzing those curves for controlling the fan rotation speed in sections. The power consumption (temperature) of the essential element is directly decreased when the temperature exceeds the preset temperature, so that the purpose of cooling is achieved. When the temperature does not exceed the preset temperature, the fan rotation speed is adjusted stepwise (the fan rotation speed is initially decreased) and the system power consumption is monitored after the fan rotation speed is adjusted so as to gradually approach the balance point of power consumption-rotation speed which is the best system power consumption. With the help of the above process of automatic adjustment, it is not necessary to collect a large amount of data for implementing the method for adjusting the fan rotation speed. By using the method of the present disclosure, only the temperature of the essential element is needed to be monitored, which reducing labor costs and saving the development cycle.

Obviously, various modifications and changes can be made by persons skilled in the art without departing from the spirit and the scope of the present disclosure. That is, when those modifications and changes are equivalent to the claims of the present disclosure, it is considered that those modifications and changes fall within the scope of the present disclosure.

What is claimed is:

1. A method for automatically optimizing power consumption, wherein a fan rotation speed is adjusted stepwise for maintaining an average power consumption of a server at a lowest level during a normal operation of the server; meanwhile, a surface temperature (Tc) or an internal temperature (Tj) of an essential element is detected, and the method for automatically optimizing power consumption comprises:
   (step S1) determining whether system information is correct or not by a baseboard management controller after power on; further proceeding the method when the system information is correct; stopping further proceeding the method when the system information is not correct;
   (step S2) by the baseboard management controller, detecting the surface temperature (Tc) or the internal temperature (Tj) of the essential element periodically with a first loop cycle time (Ts), and determining whether the surface temperature (Tc) or the internal temperature (Tj) is higher than a preset temperature (Tsp);
   (step S3) performing a PID adjustment to the fan rotation speed according to the surface temperature (Tc) or the internal temperature (Tj) of the essential element when the surface temperature (Tc) or the internal temperature (Tj) is higher than the preset temperature (Tsp); and
   (step S4) performing a stepwise adjustment to the fan rotation speed according to a current environment temperature (Ta) when the surface temperature (Tc) or the internal temperature (Tj) is not higher than the preset temperature (Tsp).

2. The method for automatically optimizing power consumption according to claim 1, wherein the system information at least includes: a baseboard management controller (BMC) version, a BIOS version, field replace unit (FRU) information and system configuration information.

3. The method for automatically optimizing power consumption according to claim 2, wherein all information recorded before step S4 is removed when step S3 is performed.

4. The method for automatically optimizing power consumption according to claim 1, wherein a range of the first loop cycle time (Ts) is defined as 1 s≤Ts≤5 s.

5. The method for automatically optimizing power consumption according to claim 4, wherein all information recorded before step S4 is removed when step S3 is performed.

6. The method for automatically optimizing power consumption according to claim 1, wherein the preset temperature (Tsp) is set up according to device specifications.

7. The method for automatically optimizing power consumption according to claim 6, wherein all information recorded before step S4 is removed when step S3 is performed.

8. The method for automatically optimizing power consumption according to claim 1, wherein, in step S4, a plurality of cycles are defined as each having a second loop cycle time (T), a present system average power consumption is calculated and compared with a minimum average power consumption in each of the plurality of cycles; the fan rotation speed is increased in a next cycle and the minimum average power consumption remains unchanged when the present system average power consumption is greater than the minimum average power consumption; the fan rotation speed is decreased in a next cycle and a value of the minimum average power consumption is updated with a value of the present system average power consumption when the present system average power consumption is less than the minimum average power consumption.

9. The method for automatically optimizing power consumption according to claim 8, wherein a present value of the fan rotation speed and the value of the present system average power consumption in a first one of the plurality of cycles are recorded, the value of the present system average power consumption is used as a value of the minimum average power consumption, and the present value of the fan rotation speed is set as a basic value corresponding to the current environment temperature (Ta).

10. The method for automatically optimizing power consumption according to claim 9, wherein all information recorded before step S4 is removed when step S3 is performed.

11. The method for automatically optimizing power consumption according to claim 8, wherein the second loop cycle time (T) is 1800 s.

12. The method for automatically optimizing power consumption according to claim 11, wherein all information recorded before step S4 is removed when step S3 is performed.

13. The method for automatically optimizing power consumption according to claim 8, wherein a formula of increasing the fan rotation speed is denoted as: S'=S+n %, wherein S represents the fan rotation speed in a present cycle, S' represents the fan rotation speed in a next cycle, n represents an amount of stepwise adjustment, and 0<n<3.

14. The method for automatically optimizing power consumption according to claim 13, wherein all information recorded before step S4 is removed when step S3 is performed.

15. The method for automatically optimizing power consumption according to claim 8, wherein a formula of decreasing the fan rotation speed is denoted as: S'=S−n %, wherein S represents the fan rotation speed in a present cycle, S' represents the fan rotation speed in a next cycle, n represents an amount of stepwise adjustment, and 0<n<3.

16. The method for automatically optimizing power consumption according to claim 15, wherein all information recorded before step S4 is removed when step S3 is performed.

17. The method for automatically optimizing power consumption according to claim 8, wherein all information recorded before step S4 is removed when step S3 is performed.

18. The method for automatically optimizing power consumption according to claim 1, wherein all information recorded before step S4 is removed when step S3 is performed.

* * * * *